United States Patent
Kasten et al.

(10) Patent No.: US 10,024,999 B1
(45) Date of Patent: Jul. 17, 2018

(54) SYSTEM AND METHOD FOR MONITORING A WELLBORE

(71) Applicant: General Electric Company, Schenectady, NY (US)

(72) Inventors: Ansas Matthias Kasten, Niskayuna, NY (US); John Scott Price, Niskayuna, NY (US); Juan Pablo Cilia, Delmar, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/688,113

(22) Filed: Aug. 28, 2017

(51) Int. Cl.
*G01V 5/12* (2006.01)
*G01T 1/20* (2006.01)
*E21B 47/00* (2012.01)

(52) U.S. Cl.
CPC .......... *G01V 5/125* (2013.01); *E21B 47/0005* (2013.01); *E21B 47/0006* (2013.01); *G01T 1/2002* (2013.01); *G01T 1/2018* (2013.01)

(58) Field of Classification Search
CPC . G01V 5/125; E21B 47/0005; E21B 47/0006; G01T 1/2002; G01T 1/2018
See application file for complete search history.

(56) References Cited

U.S. PATENT DOCUMENTS

| 4,638,164 A * | 1/1987 | Sonne ..................... G01T 1/202 250/256 |
| 4,904,865 A | 2/1990 | Meisner et al. |
| 4,956,556 A * | 9/1990 | Radtke ..................... G01T 1/20 250/361 R |
| 5,021,652 A * | 6/1991 | Arnold ..................... G01T 1/20 250/256 |

(Continued)

FOREIGN PATENT DOCUMENTS

| CN | 101929965 B | 9/2012 |
| EP | 0747569 B1 | 3/2003 |

OTHER PUBLICATIONS

Heng et al., "An Integrated LED Luminance-Uniform Device for Light Guide Plate Applications", Proceedings of the SPIE, http://adsabs.harvard.edu/abs/2007SPIE.6665E..06C, vol. 6665, Id 666506, Sep. 2007, 8 pages.

(Continued)

*Primary Examiner* — Marcus Taningco
(74) *Attorney, Agent, or Firm* — GE Global Patent Operation; Pabitra Chakrabarti

(57) ABSTRACT

A detector assembly includes a scintillator configured to generate a light signal in response to an impinging radiation signal from an object, where the scintillator has a first end and a second end. Further, the detector assembly includes a first detector disposed adjacent the scintillator and configured to receive a first portion of the light signal from the scintillator and a second detector operatively coupled to the second end of the scintillator and configured to receive a second portion of the light signal from the scintillator. The detector assembly also includes a reflector operatively coupled to the scintillator and the first detector and configured to guide the light signal from the scintillator to the first detector, where the reflector is configured to redirect the first portion of the light signal by a determined amount to reduce a path length between a radiation source, the object, and the scintillator.

23 Claims, 12 Drawing Sheets

(56) References Cited

U.S. PATENT DOCUMENTS

| | | | |
|---|---|---|---|
| 5,061,849 A | 10/1991 | Meisner et al. | |
| 5,198,770 A * | 3/1993 | Decorps | G01V 11/002 |
| | | | 181/102 |
| 5,705,812 A * | 1/1998 | Brewer | E21B 47/00 |
| | | | 250/264 |
| 7,750,306 B2 | 7/2010 | Menge et al. | |
| 8,735,803 B2 | 5/2014 | Ford et al. | |
| 9,645,258 B1 * | 5/2017 | Reyna | G01T 1/20 |
| 2002/0153481 A1 * | 10/2002 | Stoller | G01V 5/04 |
| | | | 250/266 |
| 2005/0286599 A1 | 12/2005 | Rafac et al. | |
| 2009/0014665 A1 * | 1/2009 | Fleming | G01T 1/023 |
| | | | 250/484.5 |
| 2009/0090866 A1 | 4/2009 | Zhang et al. | |
| 2009/0101808 A1 * | 4/2009 | Hassan | G01V 5/06 |
| | | | 250/265 |
| 2009/0196399 A1 * | 8/2009 | Schmitt | G01T 1/20 |
| | | | 378/145 |
| 2009/0236533 A1 * | 9/2009 | Ramsden | G01T 1/2002 |
| | | | 250/370.11 |
| 2010/0224783 A1 * | 9/2010 | Frank | G01T 1/20 |
| | | | 250/366 |
| 2011/0272570 A1 * | 11/2011 | Xu | G01V 5/107 |
| | | | 250/269.4 |
| 2013/0306876 A1 * | 11/2013 | Uchida | G01T 1/1644 |
| | | | 250/366 |
| 2014/0346337 A1 * | 11/2014 | Huiszoon | G01V 5/08 |
| | | | 250/265 |

OTHER PUBLICATIONS

Wang et al., "New Type Small-Angle Sensor Based on the Surface Plasmon Resonance Technology in Heterodyne Interferometry", Instrumentation and Measurement Technology Conference (I2MTC), May 10-12, 2011, 4 Pages.

Hu et al., "Research of the Influence of Rectangular Prism Pien Error on Angle Measurement for Photoelectric Autocollimator", Fourth International Conference on Instrumentation and Measurement, Computer, Communication and Control (IMCCC), Sep. 18-20, 2014, 4 Pages.

* cited by examiner

SYSTEM AND METHOD FOR MONITORING A WELLBORE

STATEMENT REGARDING FEDERALLY SPONSORED RESEARCH AND DEVELOPMENT

This invention was made with Government support under contract number DE-FE0024293 awarded by the Department of Energy (DOE). The Government has certain rights in this invention.

BACKGROUND

Embodiments of the present specification generally relate to inspection of a wellbore, and more specifically to a system and method for monitoring a wellbore.

The wellbore may include concentric rings of metal tubing with cement filled between the rings of metal tubing. As will be appreciated, it is desirable to monitor a wellbore to determine an integrity of the wellbore to identify presence of any defects/flaws in the wellbore.

Currently, certain techniques for monitoring the integrity of the wellbore are available. However, these techniques have limited penetration depths and/or suffer from poor defect resolution. Moreover, for plugging and abandonment of offshore wells, the standard operating procedure calls for extracting production tubing from the wellbore prior to inspection of casing and/or cemented structures. In addition, some inspection tools are presently available for the inspection of the wellbore. However, the presently available inspection tools result in diminished efficiency of inspection due to a greater path length between a source and a detector element in the inspection tool. Additionally, positioning a detector element and a scintillator crystal in close proximity to the radiation source is a challenging task.

BRIEF DESCRIPTION

In accordance with aspects of the present specification, a detector assembly is presented. The detector assembly includes a scintillator configured to generate a light signal in response to an impinging radiation signal from an object, where the scintillator has a first end and a second end. Further, the detector assembly includes a first detector disposed adjacent the scintillator and configured to receive a first portion of the light signal from the scintillator. In addition, the detector assembly includes a second detector operatively coupled to the second end of the scintillator and configured to receive a second portion of the light signal from the scintillator. The detector assembly also includes a reflector operatively coupled to the scintillator and the first detector and configured to guide the light signal from the scintillator to the first detector, where the reflector is configured to redirect the first portion of the light signal by a determined amount to reduce a path length between a radiation source, the object, and the scintillator.

In accordance with another aspect of the present specification, an inspection tool for monitoring a wellbore is presented. The inspection tool includes a radiation source. Moreover, the inspection tool includes a detector assembly disposed proximate the radiation source, where the detector assembly includes a scintillator configured to generate a light signal in response to an impinging radiation signal from an object, where the scintillator has a first end and a second end, a first detector disposed adjacent the scintillator and configured to receive a first portion of the light signal from the scintillator, a second detector operatively coupled to the second end of the scintillator and configured to receive a second portion of the light signal from the scintillator, and a reflector operatively coupled to the scintillator and the first detector and configured to guide the light signal from the scintillator to the first detector, where the reflector is configured to redirect the first portion of the light signal by a determined amount to reduce a path length between the radiation source, the object, and the scintillator.

In accordance with yet another aspect of the present specification, a method for inspecting a wellbore is presented. The method includes positioning an inspection tool in the wellbore, where the inspection tool includes a radiation source, a radiation shield disposed adjacent the radiation source, a detector assembly disposed proximate the radiation source, where the detector assembly includes a scintillator configured to generate a light signal in response to an impinging radiation signal from an object, where the scintillator has a first end and a second end, a first detector disposed adjacent the scintillator and configured to receive a first portion of the light signal from the scintillator, a second detector operatively coupled to the second end of the scintillator and configured to receive a second portion of the light signal from the scintillator, and a reflector operatively coupled to the scintillator and the first detector and configured to guide the light signal from the scintillator to the first detector, where the reflector is configured to redirect the first portion of the light signal by a determined amount to reduce a path length between the radiation source, the object, and the scintillator. Furthermore, the method includes directing the light signal, via the reflector, from the scintillator to the first detector to reduce a path length between the radiation source, the object, and the scintillator. The method also includes obtaining a first set of signal data from the first detector. In addition, the method includes obtaining a second set of signal data from the second detector. Moreover, the method includes processing, by a control unit, the first set of signal data and the second set of signal data to monitor a condition of the wellbore.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As will be described in detail hereinafter, various embodiments of a system and method for monitoring a wellbore are presented. The systems and methods presented herein entail use of a reflector such as a right-angle prism reflector to guide light from a scintillator assembly into a detector such as a photomultiplier tube (PMT), thereby shortening a height of a detector assembly for use in an inspection tool. Additionally, the exemplary design of the detector assembly enables placement of a detector or a scintillator assembly in close proximity to a radiation source such as an X-ray source or a gamma-ray source. Consequently, a standoff height of the scintillator assembly is reduced, thereby allowing an increase in a thickness of a radiation shield without moving the scintillator assembly further away from the radiation source. Moreover, disposing the scintillator assembly in closer proximity to the radiation source results in a shorter travel distance of source and backscatter photons. This arrangement results in a reduced height of the overall detector assembly, thereby enabling a more compact design of the detector assembly and reduced packaging and overall cost of the inspection tool.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

Figure 1:
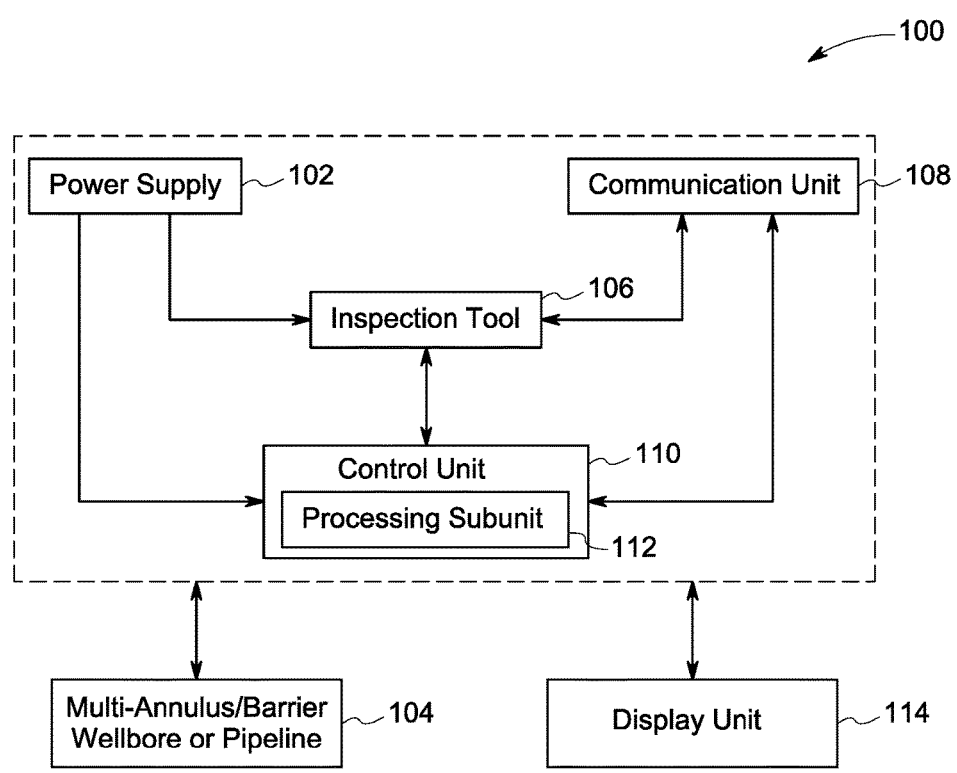
FIG. 1 is a diagrammatical representation of an exemplary system for monitoring a wellbore, in accordance with aspects of the present specification.

Turning now to the drawings, by way of example in FIG. 1, an exemplary embodiment of a system 100 for monitoring a wellbore, in accordance with aspects of the present specification, is depicted. It may be noted that the wellbore may be a part of a hydrocarbon producing well, an onshore well, a subsea or offshore well, a conventional well, an unconventional well, a pipeline, and the like. In one embodiment, the system 100 for monitoring the wellbore may include a power supply 102 and an inspection tool 106. The system 100 may also include a communication unit 108 and a control unit 110. The power supply 102 may include a battery, a direct current source, an alternating current source, and the like. Furthermore, the power supply 102 may be operatively coupled to the inspection tool 106 and may be configured to supply power to the inspection tool 106. In one non-limiting example, the control unit 110 may be a subsea control module (SCM). Although the embodiment of FIG. 1 depicts the communication unit 108 and the control unit 110 as separate units, in certain other embodiments, the control unit 110 may include the communication unit 108.

Furthermore, in one embodiment, the wellbore 104 may be a multi-barrier wellbore, a hydrocarbon producing well, an onshore well, a subsea or offshore well, a conventional well, an unconventional well, a pipeline, and the like. Also, in one example, the wellbore 104 may include a production tubing, an inner annulus (annulus A), an outer annulus (annulus B) with one or more casings sandwiched between the inner annulus and the outer annulus. Accordingly, the wellbore 104 may include multiple casings and annuli. In one example, the outer most annulus may be terminated by the wellbore surroundings, such as the rock formation. Also, in one example, the casing wall(s) may be made of a high strength steel alloy. Moreover, the inner annulus may be co-axial to the production tubing and positioned exterior to the production tubing. Further, the outer annulus may be co-axial to the inner annulus and positioned exterior to the inner annulus.

Also, in certain embodiments, the inspection tool 106 is configured to be disposed in the wellbore 104 and configured to monitor the integrity of the wellbore 104. In accordance with aspects of the present specification, the inspection tool 106 is designed to operate in various environments and inspect the environment accordingly.

Moreover, as noted hereinabove, the inspection tool 106 may be disposed in the wellbore 104 and configured to monitor/inspect a condition of the wellbore 104. More particularly, the inspection tool 106 may be configured to inspect the integrity of the wellbore 104 by identifying presence of any anomalies/defects in the wellbore 104. Some non-limiting examples of the anomalies in the wellbore 104 include an air void, a hole, a crack, pitting, rust, micro annuli, fluid channels, gas voids, and other structural flaws that may affect the integrity of the wellbore 104.

Figure 3:
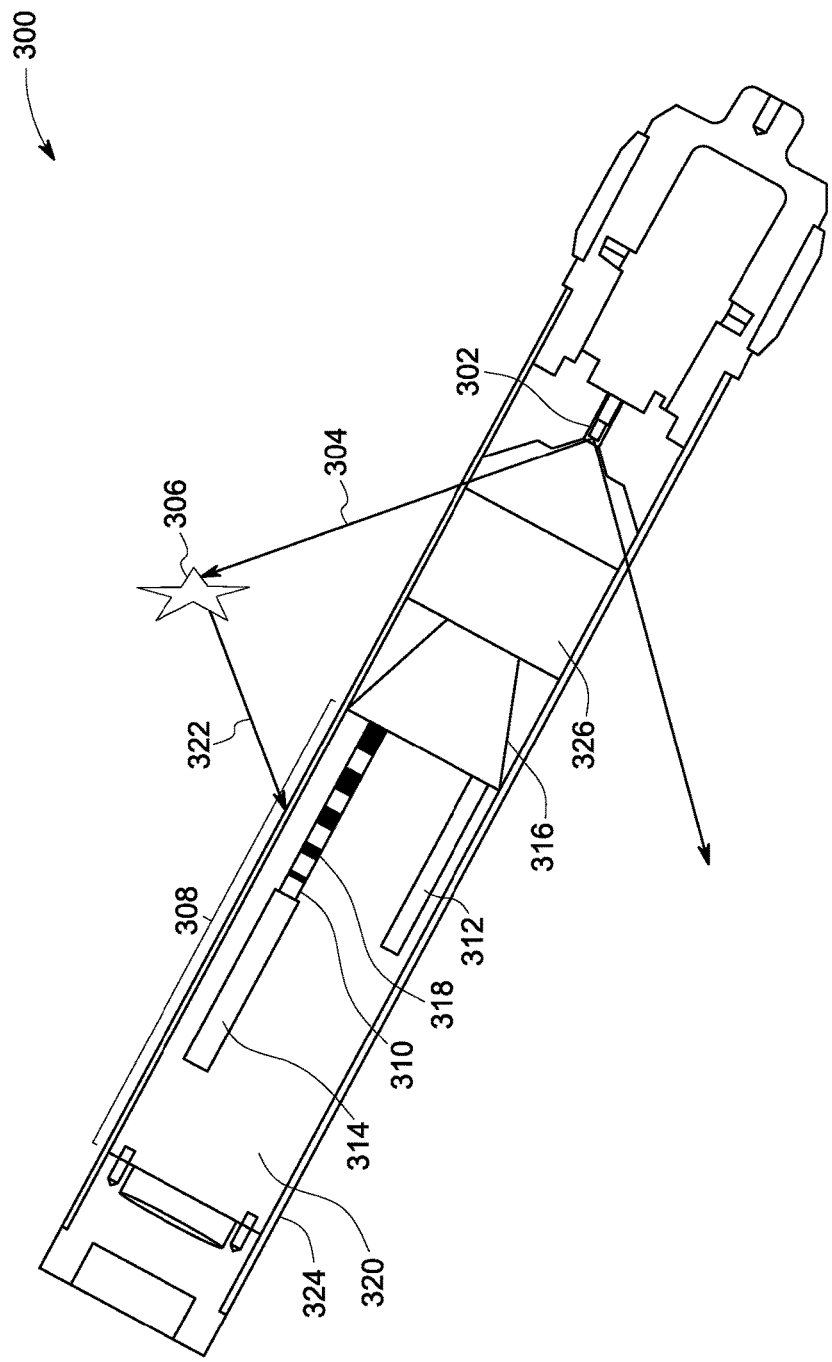
FIG. 3 is a diagrammatical representation of an exemplary inspection tool for use in the system of FIG. 1, in accordance with aspects of the present specification.

In accordance with aspects of the present specification, the inspection tool 106 includes a radiation source and a detector assembly (see FIG. 3). The radiation source is configured to generate radiation and direct the radiation towards an inspection area or volume in an object of interest. The radiation source may be X-ray radiation source, a gamma ray radiation source, and the like. In some other embodiments, the radiation source may include hybrid sources such as an electrically-powered X-ray source or particle beam generator. Also, the terms scatter object, object, and object of interest may be used interchangeably. Similarly, the terms inspection area, inspection volume, volume, and volume of interest may be used interchangeably.

In one embodiment, the detector assembly includes a scintillator configured to generate a light signal in response to an impinging radiation signal from the inspection volume in the object. The inspection volume may include a surface of a metal casing or a volume of a cement annulus of the wellbore 104. Also, the scintillator may include a single scintillator crystal, a stack of scintillator crystals, or a stack of alternating scintillator crystals and spacers/spacer elements. It may be noted that the impinging radiation signal may be an X-ray backscatter signal. Also, the terms scintillator, scintillator unit, and scintillator assembly may be used interchangeably.

Furthermore, the detector assembly includes a first detector disposed adjacent the scintillator and configured to receive a first portion of the light signal from the scintillator. In particular, the first detector is optically coupled to the scintillator. Also, the detector assembly includes a second detector operatively coupled to the scintillator and configured to receive a second portion of the light signal from the scintillator. It may be noted that the terms detector and detector element(s) may be used interchangeably.

In addition, the detector assembly includes a reflector operatively coupled to the scintillator and the first detector and configured to guide the first portion of the light signal from the scintillator to the first detector. More particularly, the reflector is configured to receive the first portion of the light signal from the scintillator and redirect or "bend" the first portion of the light signal by a determined amount prior to conveying the first portion of the light signal to the first detector. In some embodiments, the determined amount may be in a range from about 150 degrees to about 210 degrees. Also, in one non-limiting example, the determined amount by which the first portion of the light signal is bent is about 180 degrees. This arrangement aids in reducing a path length traveled by the source radiation between the radiation source and the inspection volume in the detector assembly. Additionally, this arrangement also aids in reducing the path length traveled by the X-ray backscatter signal between the inspection volume and the scintillator in the detector assembly. The inspection tool 106 will be described in greater detail with reference to FIGS. 3-9.

In addition, the communication unit 108 may be operatively coupled to the inspection tool 106. The communication unit 108 may be configured to transmit information to and/or receive information from the inspection tool 106. In one non-limiting example, the communication unit 108 may be disposed at a remote location. In another example, the communication unit 108 may be placed on or about wellbore 104. Also, the communication unit 108 may include electronic circuitry such as a transmitter, a receiver, and the like. In one example, a transmitter of the communication unit 108 may be disposed on or about the wellbore 104 and a receiver of the communication unit 108 may be disposed at a remote location. Furthermore, the power supply 102 and the communication unit 108 may be operatively coupled to the inspection tool 106 using a wired connection, a wireless connection, and the like. It may be noted that in certain embodiments, the power supply 102 may be an integral part of the inspection tool 106, while in other embodiments, the power supply 102 may be disposed at a location that is remote from the inspection tool 106.

Also, the control unit 110 may be operatively coupled to the communication unit 108 and/or the inspection tool 106. Any information/data from the inspection tool 106 may be communicated from the inspection tool 106 to the control unit 110 via use of the communication unit 108. The data communicated from the inspection tool 106 may include electrical signals generated by the detectors in response to respective portions of the light signal received from the scintillator. Additionally, the inspection tool 106 may also be configured to generate and transmit positional data to the control unit 110. Other examples of data communicated from the inspection tool may include detector count rates, ratio of count rates between detectors, and the like.

In one embodiment, the control unit 110 may include a processing subunit 112. The processing subunit 112 may include at least one processor configured to process received data. Further, the processing subunit 112 may be configured to analyze the data generated by the inspection tool 106. Furthermore, the processing unit 112 may be configured to identify a structural flaw/fault in one or more components of the wellbore 104 based on an analysis of the data. Some non-limiting examples of structural flaws/faults in one or more components of wellbore 104 may include a defect or an anomaly in a casing wall, the annuli, cement employed in the wellbore 104, the production tubing, a tubing hanger, or other wellbore structures. In addition, based on the identification of a fault, the control unit 110 may be configured to communicate the identified fault to the communication unit 108 and/or a user. Information related to the identified fault may be used to take any desired/appropriate corrective action. It may be noted that in certain embodiments, a processing subunit 112 may also be disposed within the inspection tool 106.

In one embodiment, the inspection tool 106 may be a wire-line tool. In this example, the wire-line tool (inspection tool 106) is introduced into the production tubing or the inner annulus through a service access. Once the wire-line tool 106 is introduced into the production tubing or the inner annulus, the wire-line tool 106 may be configured to monitor/inspect the production tubing or the inner annulus for presence of any defects/anomalies. For example, the wire-line tool 106 may be introduced into the production tubing for inspecting the integrity of an outer cement annulus. It may be noted that may communication or coupling may include wired coupling, wireless coupling, electrical coupling, magnetic coupling, radio communication, software based communication, or combinations thereof.

In certain embodiments, the system 100 may also include a display unit 114. In other embodiments, the system 100 may be communicatively coupled to the display unit 114. The system 100 may be configured to visualize the identified anomaly, positional information corresponding to the identified anomaly, signal data from the detectors, and the like on the display unit 114.

The robust design of the inspection tool 106 allows placement of a detector or a scintillator in close proximity to the radiation source. Also, the proximate placement of the scintillator to the radiation source results in a shorter travel distance of source and backscatter photons, thereby resulting in improved signal to noise ratio (SNR) of the inspection tool 106. Moreover, a more compact design may be achieved, thereby advantageously reducing packaging and overall cost of the inspection tool 106. Furthermore, the inspection tool 106 permits inspection of the casings and annuli of the wellbore 104 without having to extract the production tubing out from its current location.

Figure 2:
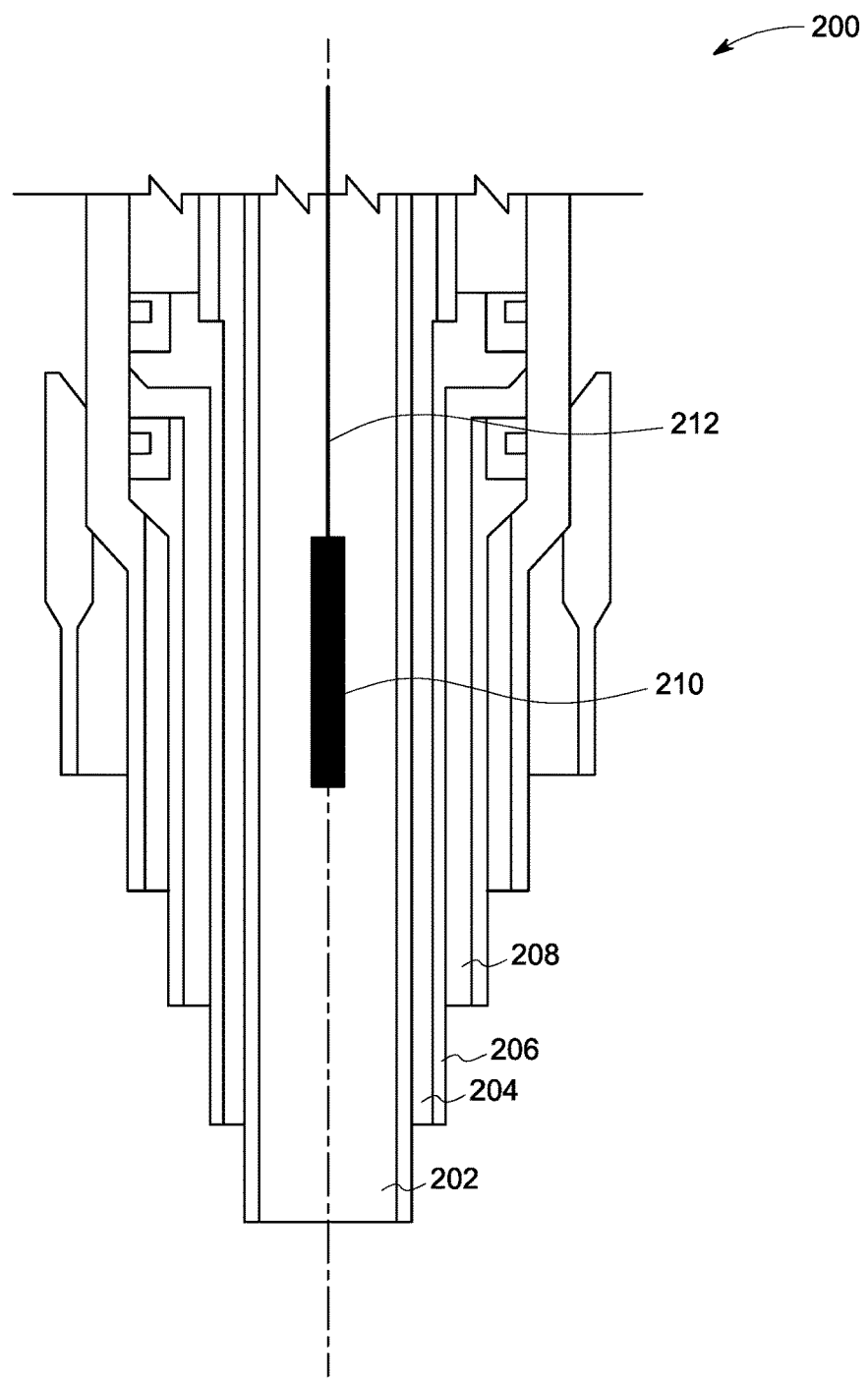
FIG. 2 is a diagrammatical representation of a portion of the system of FIG. 1, in accordance with aspects of the present specification.

FIG. 2 is a diagrammatical representation of a wellbore 200. Particularly, FIG. 2 depicts an arrangement of an inspection tool such as the inspection tool 106 of FIG. 1 in the wellbore 200. As previously noted, the wellbore 200 may be a multi-barrier wellbore and include multiple casings and annuli. In the example depicted in FIG. 2, the wellbore 200 may include a production tubing 202, an inner annulus 204, a casing wall 206, and an outer annulus 208. It may be noted that the terms inner annulus and annulus A may be used interchangeably. Similarly, the terms outer annulus and annulus B may be used interchangeably.

The casing wall 206 may be disposed between the inner annulus 204 and the outer annulus 208. Additionally, the outer annulus 208 may be coaxial to the inner annulus 204 and may be placed exterior to the inner annulus 204. Moreover, in the example of FIG. 2, an inspection tool 210 may be introduced into the production tubing 202 from a service access. In one embodiment, the inspection tool 210 may be operatively coupled to a wire-line cable 212. The inspection tool 210 may be lowered into the production tubing 202 and configured to monitor/inspect the wellbore 200 for any defects/anomalies. The working of the inspection tool 210 will be described in greater detail with reference to FIG. 3.

Referring now to FIG. 3, one embodiment 300 of an inspection tool configured to monitor a wellbore such as the wellbores 104, 200 (See FIGS. 1-2) is depicted. The inspection tool 300 may be representative of one embodiment of the inspection tools 106, 210 (see FIGS. 1-2).

As previously noted, the inspection tool 300 may be positioned/lowered into the production tubing of a wellbore to inspect the integrity of the wellbore. In one example, the object of interest may be the production tubing. In another example, object of interest may be the multiple casings and/or the annuli in the wellbore. Also, in this example, the inspection tool 300 is configured to monitor the integrity of the wellbore by identifying presence of defects/anomalies in the wellbore structures.

The inspection tool 300 includes a radiation source 302 configured to generate radiation. The radiation source 302 may be an X-ray radiation source, a gamma ray radiation source, and the like. For ease of explanation, in the example of FIG. 3, the radiation source 302 is an X-ray radiation source. The X-ray radiation source 302 is configured to generate an X-ray source beam 304 and transmit the X-ray source beam 304 in multiple directions. As depicted in the example of FIG. 3, the X-ray source beam 304 may be directed towards an inspection volume 306 in an object of interest. Reference numeral 322 is generally representative of a backscatter X-ray signal/beam that is generated when the X-ray source beam 306 impinges on the inspection volume 306.

Furthermore, the inspection tool 300 include an exemplary detector assembly 308. The detector assembly 308 includes a scintillator 310 having a first end and a second end. The scintillator 310 is configured to receive the backscatter X-ray signal 322 and generate a light signal in response to the impinging backscatter X-ray radiation signal 322. In certain embodiments, a scintillator collimator 318 may be disposed on the scintillator 310 and configured to selectively attenuate/receive the impinging backscatter X-ray radiation signal 322. More particularly, the scintillator collimator 318 is configured to select one or more portions of the backscatter X-ray radiation signal 322 that correspond to one or more desired view directions, thereby facilitating inspection of desired volumes of the wellbore.

In addition, the detector assembly 308 includes a first detector 312 that is disposed adjacent to the scintillator 310 and configured to receive a first portion of the light signal generated by the scintillator 310. Moreover, the detector assembly 308 includes a second detector 314 that is disposed adjacent to the second end of the scintillator 310 and configured to receive a second portion of the light signal generated by the scintillator 310, where the second portion of the light signal is different from the first portion of the light signal. In one embodiment, the first and second detectors 312, 314 may be photomultiplier tubes (PMTs) that are configured to respectively convert the first and second portions of the light signal into corresponding electrical signals. Moreover, count ratios corresponding to the first and second detectors 312, 314 aid in identifying a portion of the scintillator 310 that has been impinged upon by the X-ray backscatter signal 322.

In accordance with further aspects of the present specification, the detector assembly 308 includes a reflector 316 that is operatively coupled to the scintillator 310 and the first detector 312. In particular, the first end of the scintillator 310 and the first detector 312 are optically coupled to the reflector 316. The reflector 316 is configured to guide the light signal and more particularly the first portion of the light signal from the scintillator 310 to the first detector 312. More specifically, the reflector 316 is configured to redirect the first portion of the light signal received from the scintillator 310 by a determined amount and convey the redirected first portion of the light signal to the first detector 312. Employing the reflector 316 as noted hereinabove aids in reducing a path length traversed by the X-ray source beam 304 to the inspection volume 306 and a path length traversed by the backscatter X-ray radiation signal 322 from the inspection volume 306 to the scintillator 310.

Furthermore, in certain embodiments, the reflector 316 includes a first reflective surface and a second reflective surface. In another embodiment, the reflector 316 includes a first prism having a first outer reflective surface and a second prism having a second outer reflective surface. Moreover, in yet another embodiment, the reflector 316 includes a first prism having a first inner reflective surface and a second prism having a second inner reflective surface. Also, in one embodiment, the reflector 316 includes a right-angled prism reflector. In addition, a reflective coating may be disposed on at least a portion of an outer surface of the reflector. The reflective coating is configured to aid in reflecting light that is not guided by total internal reflection. It may be noted that the reflective coating may include aluminum, silver, gold, protected aluminum, a high-temperature reflective film, or combinations thereof. The reflector 316 will be described in greater detail with reference to FIGS. 7-9.

Additionally, the detector assembly 308 includes a detector housing 320 configured to be selectively opaque to the impinging backscatter X-ray signal 322. In certain embodiments, the detector housing 320 is configured to surround at least the scintillator 310, the first detector 312, the second detector 314, and the reflector 316.

With continuing reference to FIG. 3, the inspection tool 300 includes a source radiation shield 326 configured to shield the detector assembly 308 from radiation generated by the radiation source 302. The source radiation shield 306 is disposed between the radiation source 302 and the detector assembly 308. Moreover, the inspection tool 300 also includes a tool collar 324 that encapsulates the inspection tool 300.

In accordance with further aspects of the present specification, the inspection tool 300 is configured to aid in determining presence of an anomaly in the wellbore based on intensities of the signal data received from the first and second detectors 312, 314. A processing unit such as the processing subunit 112 of FIG. 1 may be configured to process the signal data received from the first and second detectors 312, 314. In particular, the processing subunit 112 may be configured to identify any variation in the intensities of the signal data received from the first and second detectors 312, 314. These variations in the signal data may be indicative of an anomaly or defect in the wellbore structures. By way of example, detector elements in the first and second detectors 312, 314 may be configured to monitor intensities of the received backscatter X-ray radiation signal 322. If the X-ray source beam 304 encounters an air void or any other defect in the inspection volume 306 in object of interest, there is a reduction in the count rate of the backscatter X-ray radiation signal 322. Accordingly, the detector elements in the first and second detectors 312, 314 may be configured to monitor the backscatter X-ray radiation signal 322 for any drop/reduction in the count rates of the of the backscatter X-ray radiation signal 322 to identify presence of a defect in the inspection volume 306 in the object.

Additionally, the inspection tool 300 is configured to obtain/generate positional resolution/location of any identified anomalies in the wellbore. Any identified anomalies may be localized in an azimuthal direction and a depth direction perpendicular to a long axis of the wellbore. To that end, a ratio of the detected count rates corresponding to the first and second detectors 312, 314 may be computed. This ratio of the detected count rates aids in identifying the portion of the scintillator 310 activated by the backscatter X-ray radiation signal 322. Moreover, this ratio provides depth information corresponding to any structural flaws identified in the wellbore. Furthermore, multiple dual ended detector assemblies may be arranged in a determined pattern such as a circular pattern around the long axis of the wellbore to provide azimuthal defect resolution. The depth resolution and azimuthal resolution may be employed to accurately identify the location of a detected defect.

Moreover, the processing subunit 112 may be configured to identify a detector element in the first detector 312 and/or second detector 314 corresponding to the signal data having the variations. Positional information corresponding to that detector element may be obtained by the processing subunit 112. In one embodiment, the positional resolution is provided by logging/moving the inspection tool 300 along the long axis of the wellbore. This information may be used to identify the location of the anomalies in the wellbore. It may be noted that in certain embodiments, a processing subunit 112 may be disposed within the inspection tool 300.

As previously noted, the inspection tool 300 is positioned in a wellbore to inspect and/or monitor the integrity of the wellbore. The working of the inspection tool 300 will be described in greater detail with reference to FIGS. 4-13.

Implementing the inspection tool 300 as described hereinabove provides for a detector assembly 308 having a reduced height. This reduced height of the detector assembly 308 allows use of a source radiation shield 326 of greater thickness without having to position/displace the scintillator 310 away from the radiation source 302. Also, proximate positioning of the scintillator 310 to the radiation source 302 shortens the travel path length of radiation signal from the radiation source 302 to the scintillator 310 via the object. Moreover, the increased radiation shield thickness and the reduced travel path length result in improved SNR of the inspection tool 300. Also, the positional information corresponding to the identified anomalies in the wellbore may be determined via use of the inspection tool 300.

Figure 4:
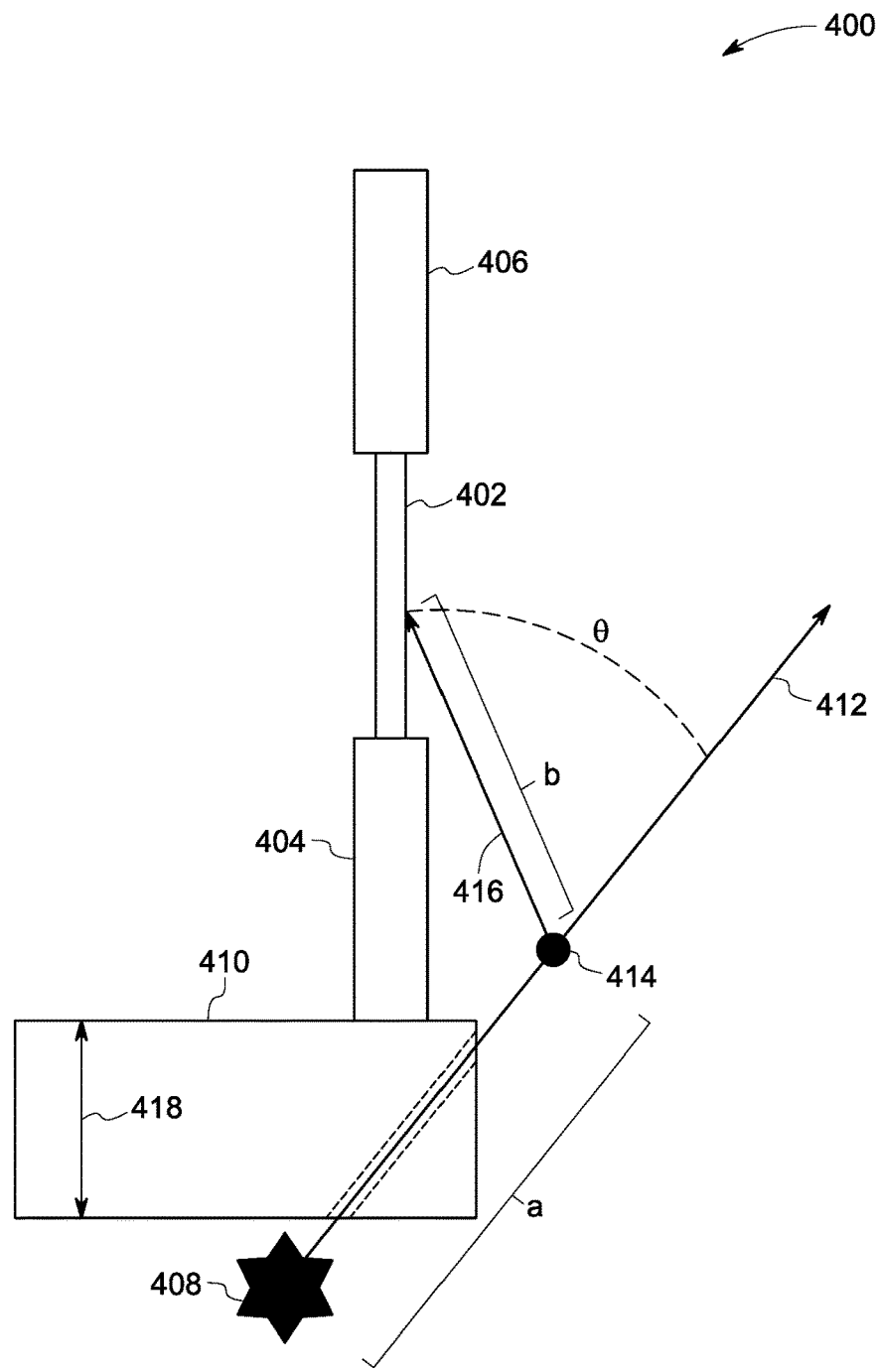
FIG. 4 is a diagrammatical representation of a presently available inspection tool.

FIG. 4 is one example 400 of a currently available inspection tool or device. In the example depicted in FIG. 4, the inspection tool includes a scintillator 402, a first detector 404, and a second detector 406. In addition, the device 400 includes a radiation source 408 and a radiation source shield 410 disposed between the radiation source 408 and the first detector 404. Reference numeral 418 is generally representative of a height of the radiation source shield 410. The radiation source 408 generates and directs a source beam 412 towards an object of interest 414. Once the source beam 412 impinges on the object 414, a backscatter signal 416 is generated. This backscatter signal 416 impinges on the scintillator 402.

A distance between the radiation source 408 and the object 414 may be generally represented by "a" and a distance between the object 414 and the scintillator 402 may be generally represented by "b." Also, "θ" is generally representative of a Compton backscatter angle. For efficient operation of the inspection tool, it is desirable to have a shorter path distance (a+b) between the source 408 and the scintillator 402. However, due to a required thickness 418 of the radiation source shield 410, the source beam 412 traverses a longer path length (a+b) from the radiation source 408 to the scintillator 402, resulting in lower signal intensity of the backscatter signal 416. This longer path length adversely impacts the efficiency of the inspection tool.

Additionally, certain currently available inspection tools fail to provide position sensitive detection due to use of a single detector and scintillator. Although, certain inspection tools entail use of position sensitive detectors, these tools are not suitable for high-temperature operation.

Figure 5:
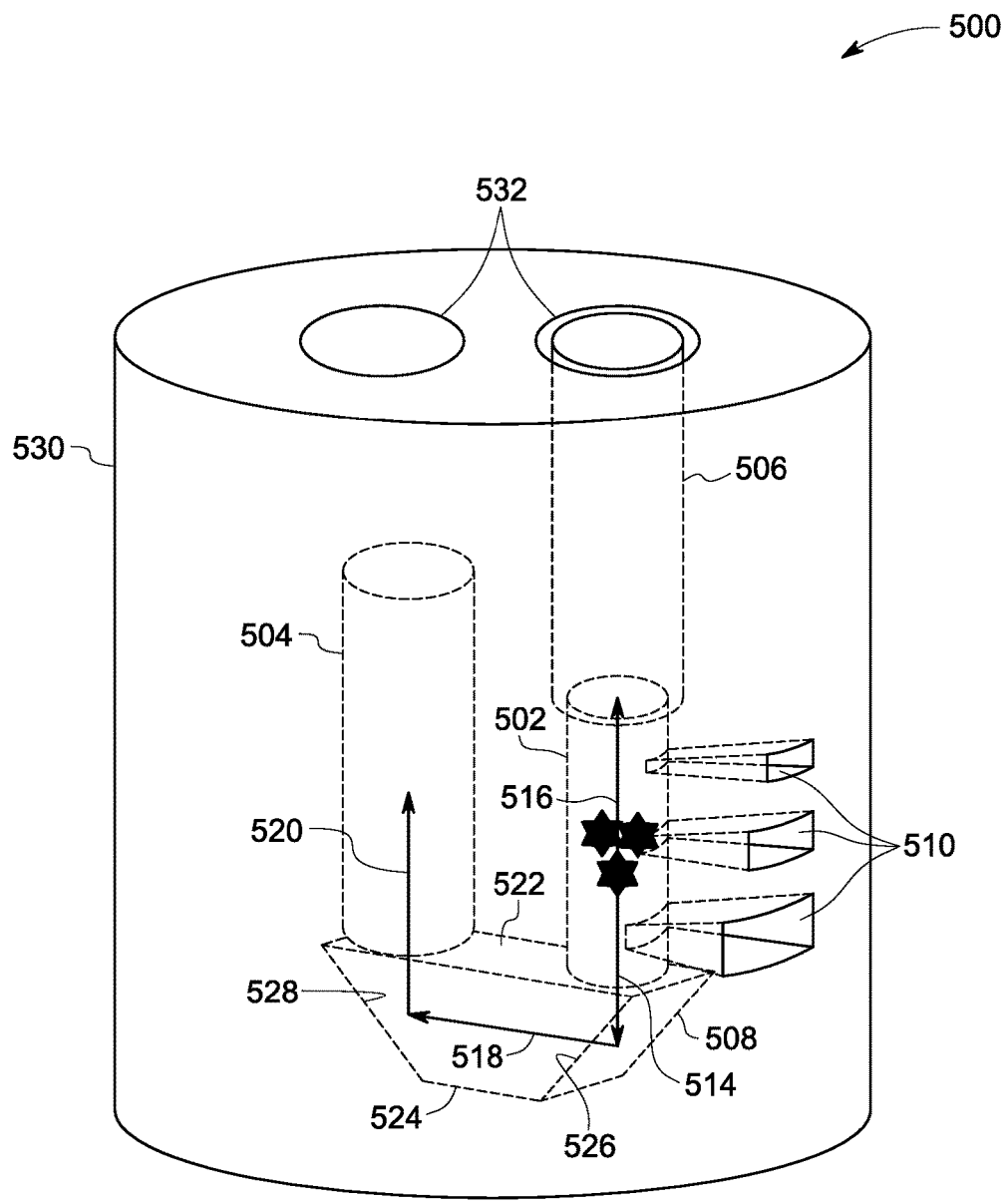
FIG. 5 is a diagrammatical representation of an exemplary detector assembly for use in the inspection tool of FIG. 3, in accordance with aspects of the present specification.

In accordance with aspects of the present specification, the shortcomings of the currently available inspection tools may be circumvented via use of an exemplary detector assembly configured for use in the inspection tool 106 of FIG. 1. Referring now to FIG. 5, one embodiment of a detector assembly 500 is presented. It may be noted that the detector assembly 500 is one example of the detector assembly 308 of FIG. 3. The detector assembly 500 presented in FIG. 5 is representative of a dual readout detector assembly.

The detector assembly 500 includes a scintillator 502 that is configured to generate a light signal in response to an impinging backscatter X-ray signal from an object. In addition, the detector assembly 500 includes a first detector 504 and a second detector 506. Moreover, the detector assembly 500 includes a reflector 508. In the example of FIG. 4, the reflector 508 is a right-angle prism reflector. In one embodiment, the reflector 508 may have a first surface 522 and a second surface 524. Additionally, the reflector 508 may have a first interior reflective surface 526 and a second interior reflective surface 528 to aid in redirecting or bending a portion of the light signal by a determined amount. As previously noted, in certain embodiments, the determined amount may be in a range from about 150 degrees to about 210 degrees. One non-limiting example of the determined amount is about 180 degrees. Moreover, in one example, the first and second interior reflective surfaces 526, 528 may be disposed at an angular inclination of about 45 degrees with reference to the first surface 522 of the reflector 508. Various embodiments of the reflector 508 will be described in greater detail with reference to FIGS. 7-9.

In a presently contemplated configuration, a first end of the scintillator 502 is disposed on the first surface 522 of the reflector 508. Moreover, the first detector 504 is disposed adjacent to the scintillator 508 on the first surface 522 of the reflector 508. In particular, the first detector 504 is optically coupled to the scintillator 502 via the reflector 508. Further, the second detector 506 is operatively coupled to a second end of the scintillator 508.

As previously noted, the scintillator 502 generates a light signal in response to the impinging backscatter X-ray signal from an inspection volume in the object. In one embodiment, a first portion 514 of the light signal is channeled to the first detector 504, while a second portion 516 of the light signal is channeled to the second detector 506. In particular, the first portion 514 of the light signal is channeled from the scintillator 502 to the first detector 504 via the reflector 508. More specifically, the reflector 508 is configured to guide the first portion 514 of the light signal from the scintillator 502 to the first detector 504 by redirecting or bending the first portion of the light signal by the determined amount. As previously noted, in one embodiment, the determined amount may be in a range from about 150 degrees to about 210 degrees. In one non-limiting example, the determined amount may be about 180 degrees.

It may be noted that in the example of FIG. 5, one example of redirecting the light by a determined amount of about 180 degrees is depicted. By way of example, in FIG. 5, when the first portion 514 of the light signal impinges on the first interior reflective surface 526 of the reflector 508, the first portion 514 of the light signal is redirected or reflected by 90 degrees. The redirected first portion (first redirected portion) of the light signal is generally represented by reference numeral 518. The first redirected portion 518 is conveyed towards the second interior reflective surface 528 of the reflector 508. When the first redirected portion 518 of the light signal impinges on the second reflective surface 528, the first redirected portion 518 is reflected or redirected again by 90 degrees to form a second redirected portion 520 of the first portion 514 of the light signal. The second redirected portion 520 is conveyed to the first detector 504. Accordingly, in the example of FIG. 5, the first portion 514 of the light signal is redirected by 180 degrees via use of the reflector 508 prior to being conveyed to the first detector 504.

Further, the detector assembly 500 includes a scintillator collimator 510 that is disposed around the scintillator 502 and configured to selectively attenuate or receive the impinging backscatter X-ray signal. The scintillator collimator 510 will be described in greater detail with reference to FIG. 6.

Additionally, the detector assembly 500 includes a detector housing 520. In certain embodiments, the detector housing 530 is configured to surround at least the scintillator 502, the first detector 504, the second detector 506, and the reflector 508. The detector housing 530 is configured to be opaque to radiation signals such as X-ray signals and/or gamma ray signals. Also, the detector housing 530 is formed using materials such as, but not limited to, optically transparent leaded glass, tungsten, lead, depleted uranium, tungsten carbide, and other dense metals. Moreover, the detector housing 530 includes one or more openings/slots that are transparent to impinging X-ray radiation. It may be noted that these openings in the detector housing 530 may be aligned to match the openings in the scintillator collimator 510. Also, the detector housing 530 may include one or more openings 532 that allow insertion of the scintillator 502, and the first and second detectors 504, 506.

Implementing the arrangement of the scintillator 502, the first detector 504, the second detector 506, and the reflector 508 as described hereinabove allows the first detector 504 to be disposed adjacent to the scintillator 502 on the first surface 522 of the reflector 508 as opposed to being positioned below the scintillator 502 in the currently available detector assemblies. This arrangement results in a reduced height of the overall detector assembly 500, thereby enabling a more compact design of the detector assembly 500. The reduced height of the detector assembly 500 allows the scintillator 502 and/or the detectors 504, 506 to be positioned in close proximity to the radiation source, thereby shortening a path length traversed by the radiation signal between the radiation source, the inspection volume in the object of interest, and the scintillator/detectors. The shortened travel path in turn results in an improved SNR of the detector assembly 500 and leads to a compact design of the detector assembly and the inspection tool.

Figure 6:
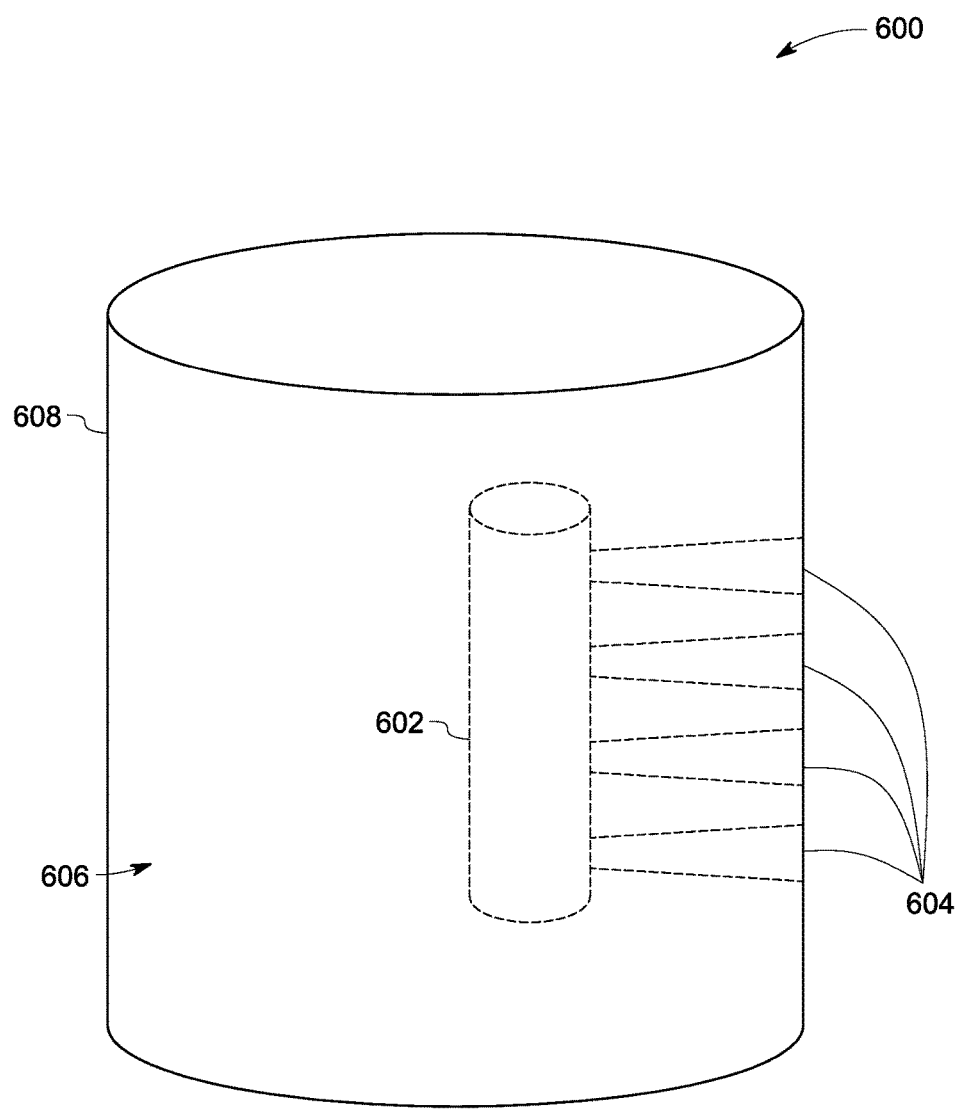
FIG. 6 is a diagrammatical representation of an exemplary scintillator collimator for use in the inspection tool of FIG. 3, in accordance with aspects of the present specification.

Turning now to FIG. 6, a portion 600 of the inspection tool 300 of FIG. 3 is depicted. In particular, for ease of illustration, the example 600 of FIG. 6 depicts a subset of the components of the inspection tool 300 FIG. 3. The example of FIG. 6 depicts a scintillator 602, a scintillator collimator 604, a detector housing 606, and a tool collar 608. It may be noted that these components are respectively similar to corresponding components 310, 318, 320, and 324 of FIG. 3.

As previously noted, the scintillator collimator 604 is disposed around the scintillator 602 and configured to selectively attenuate/receive impinging backscatter X-ray radiation signal generated by an inspection volume in an object of interest. In particular, the scintillator collimator 604 is configured to select one or more portions of the backscatter X-ray radiation signal corresponding to one or more desired view directions. In accordance with aspects of the present specification, the scintillator collimator 604 includes one or more openings that are substantially transparent to the impinging backscatter X-ray radiation signal. In one embodiment, the openings may include an empty space or may be formed using X-ray transparent material such as, but not limited to, beryllium, titanium, aluminum, polyether ether ketone (PEEK), and other low density materials. Also, the other portion of the scintillator collimator 604 may be formed using high density materials such as lead, tungsten carbide, and the like.

Moreover, the detector housing 606 is configured to surround at least the scintillator 602. The detector housing 606 is configured to be substantially opaque to X-rays and/or gamma rays. In certain embodiments, the detector housing 606 may be formed using materials such as, but not limited, to tungsten, tungsten carbide, lead, and other dense metals. Additionally, the detector housing 606 includes one or more openings that are aligned with the openings of the scintillator collimator 604.

Furthermore, the inspection tool 600 includes a tool collar 608. The tool collar 608 is configured to encapsulate all the components of the inspection tool (see FIG. 3). Moreover, in certain embodiments, the tool collar 608 is substantially transparent to X-ray and/or gamma radiation. Also, in some embodiments, the tool collar 608 may be formed using titanium, aluminum, and other low density materials.

Figure 7:
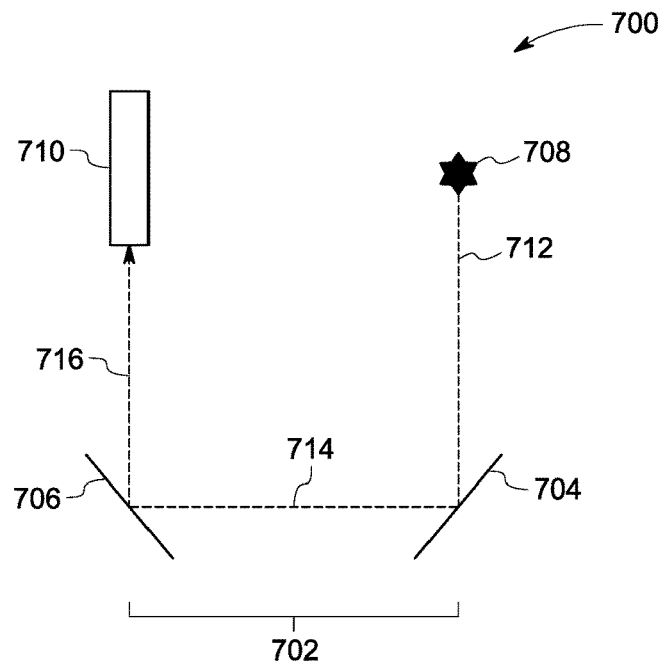
FIGS. 7-9 are diagrammatical representations of various embodiments of a reflector for use in the inspection tool of FIG. 3, in accordance with aspects of the present specification.
Figure 8:
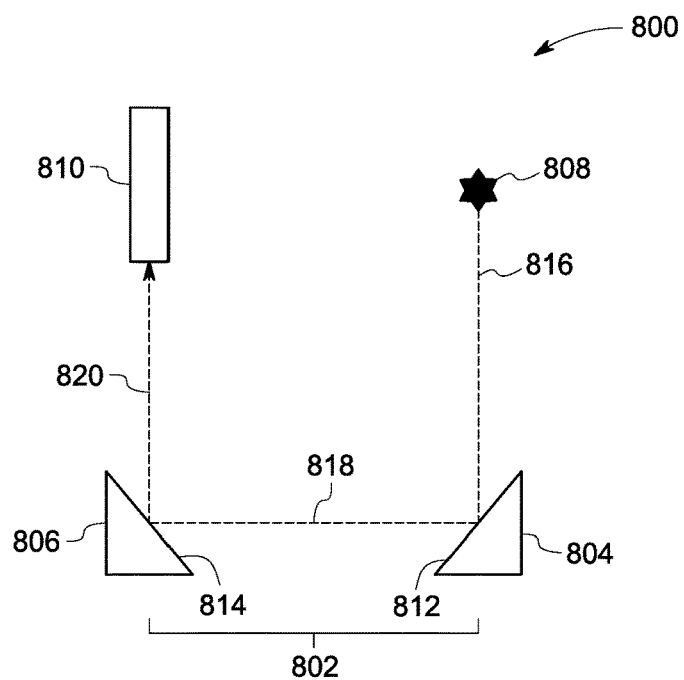
Figure 9:
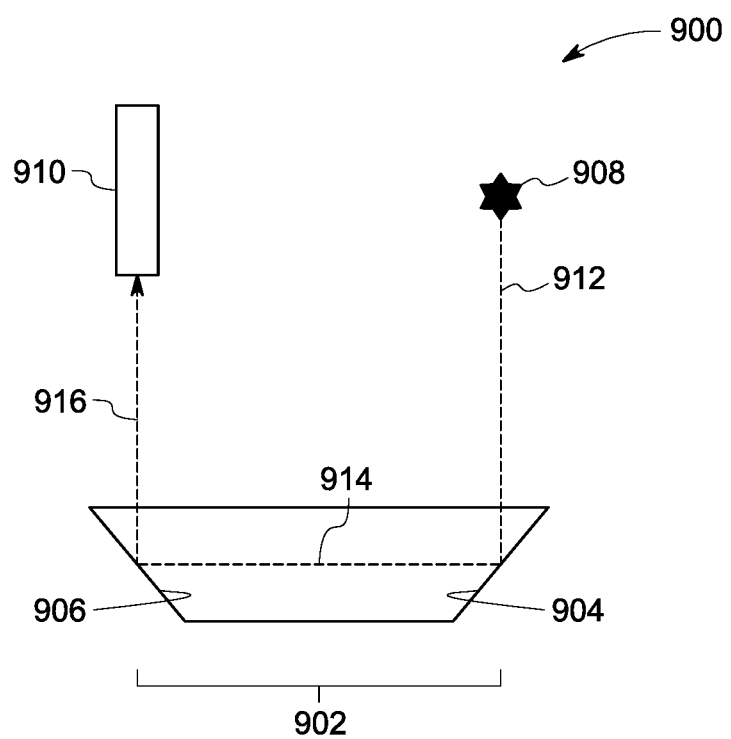

As previously noted, in accordance with aspects of the present specification, the inspection tool and the detector assembly in particular includes a reflector configured to redirect at least a portion of light received from the scintillator and convey the redirected portion of the light to a detector. FIGS. 7-9 depict various embodiments of a reflector for use in the detector assembly 500 (see FIG. 5) of the inspection tool 300 (see FIG. 3). In particular, FIGS. 7-9 depict the redirecting/bending of light by 180 degrees using the reflector. However, use of reflectors configured to redirect the light by different amounts are also envisaged. It may be noted that in FIGS. 7-9, a scintillator is representative of the scintillator 310 (see FIG. 3) and a detector is representative of the first detector 312 of FIG. 3.

Referring now to FIG. 7, one example 700 of redirecting or bending light by 180 degrees using a reflector 702 is depicted. In this example, the reflector 702 includes a first reflective surface 704 and a second reflective surface 706, where the first and second reflective surfaces 704, 706 are configured to direct the light from a scintillator 708 to a detector 710.

As previously noted, a first portion 712 of the light signal generated by the scintillator 708 is conveyed to the first detector 710 that is disposed adjacent to the scintillator 708. The first portion 712 of the light impinges on the first reflective surface 704 and is reflected by 90 degrees to generate a first bent portion 714 of the light signal. The first bent portion 714 of the light signal is directed towards the second reflective surface 706. Upon impinging on the second reflective surface 706, the first bent portion 714 is reflected again by 90 degrees to form a second bent portion 716 of the light signal. The second bent portion 716 is guided to the first detector 710. Accordingly, in this example, the light signal generated by the scintillator 702 is redirected or "bent" by 180 degrees and the bent signal is guided to the first detector 710.

FIG. 8 depicts another example 800 of redirecting or bending light by 180 degrees using a reflector 802. In this example, the reflector 802 includes a first corner prism 804 and a second corner prism 806. More particularly, each of the first and second corner prisms 804, 806 includes a corresponding reflective surface configured to direct the light from a scintillator 808 to a detector 810. By way of example, the first corner prism 804 includes a first reflective surface 812, while the second corner prism 806 includes a second reflective surface 814. It may be noted that in the example of FIG. 8, the first and second reflective surfaces 812, 814 are respectively representative of exterior surfaces of the first and second corner prisms 804, 806.

Further, a first portion 816 of the light signal generated by the scintillator 808 is directed to the first detector 810 that is disposed adjacent to the scintillator 808. By way of example, the first portion 816 of the light signal impinges on the first reflective surface 812 of the first corner prism 804 and is reflected by 90 degrees to generate a first bent portion 818 of the light signal. In addition, the first bent portion 818 of the light signal guided towards the second reflective surface 814 of the second corner prism 806. When the first bent portion 818 of the light signal impinges on the second reflective surface 814, the first bent portion 818 is reflected again by 90 degrees to form a second bent portion 820 of the light signal. The second bent portion 820 is directed to the first detector 810. In this example, the light signal generated by the scintillator 802 is "bent" or redirected by 180 degrees and the redirected/bent signal is guided to the first detector 810.

Turning now to FIG. 9, yet another example 900 of redirecting/bending light by 180 degrees using a reflector 902 is presented. In this example, the reflector 902 is a right-angle prism reflector. Further, the right-angle prism reflector 902 includes a first reflective surface 904 and a second reflective surface 906. In the example of FIG. 9, the first and second reflective surfaces 904, 906 are representative of interior surfaces of the right-angle prism reflector 902. The first and second reflective surfaces 904, 906 are configured to direct the light from a scintillator 908 to a detector 910 by total internal reflection. In one embodiment, the right-angle prism 902 may be formed using an optically transparent material such as glass. It may be noted that the term right-angle prism reflector and dove prism may be used interchangeably.

Additionally, in certain embodiments, a reflective material may be disposed on outer/exterior surfaces of the reflective surfaces 904, 906. The reflective material so disposed aids in reflecting any light that is not completely reflected by total internal reflection. Moreover, openings in the reflective coating may be provided to allow light from the scintillator 908 to enter the right-angle prism reflector 902 and to guide redirected light to exit from the right-angle prism reflector 902 towards the first detector 910.

Further, a first portion 912 of the light signal generated by the scintillator 908 is conveyed to the first detector 910 that is disposed adjacent to the scintillator 908. In particular, the first portion 912 of the light signal impinges on the first reflective surface 904 of the right-angle prism reflector 902 and is reflected by 90 degrees to generate a first reflected or redirected portion 914 of the light signal. Additionally, the first reflected portion 914 of the light signal guided towards the second reflective surface 906 of the right-angle prism reflector 904. When the first reflected portion 914 of the light signal impinges on the second reflective surface 906, the first reflected portion 914 is reflected/redirected again by 90 degrees to form a second reflected portion 916 of the light signal. The second reflected portion 916 is directed to the first detector 910. In this example, the light signal generated by the scintillator 908 is redirected or bent by 180 degrees and the redirected signal is directed to the first detector 910.

It may be noted that the example of FIG. 9 depicts the light signal 912 being redirected from the scintillator 908 to the first detector 910 by first reflecting the light signal by 90 degrees to generate the first reflected portion 914 followed by a second reflection of the first reflected signal by another 90 degrees to generate the second reflected portion 916. However, in accordance with further aspects of the present specification, the light signal 912 may be reflected or bent multiple times to generate the second reflected portion 916 that is guided to the first detector 910. It may be noted that in this example, the light signal 912 may be reflected by different amounts and is not limited to reflections by 90 degrees. The embodiment 900 of FIG. 9 advantageously utilizes the principle of total internal reflection to enhance light throughput.

The various embodiments of the reflectors presented in FIGS. 7-9 allow placement of the first detector adjacent to the scintillator. This arrangement advantageously results in a reduction in the height of the detector assembly and in turn the overall height of the inspection tool. Moreover, these arrangements also shorten the length of the path traveled from the radiation source to the scintillator/detector.

Figure 10:
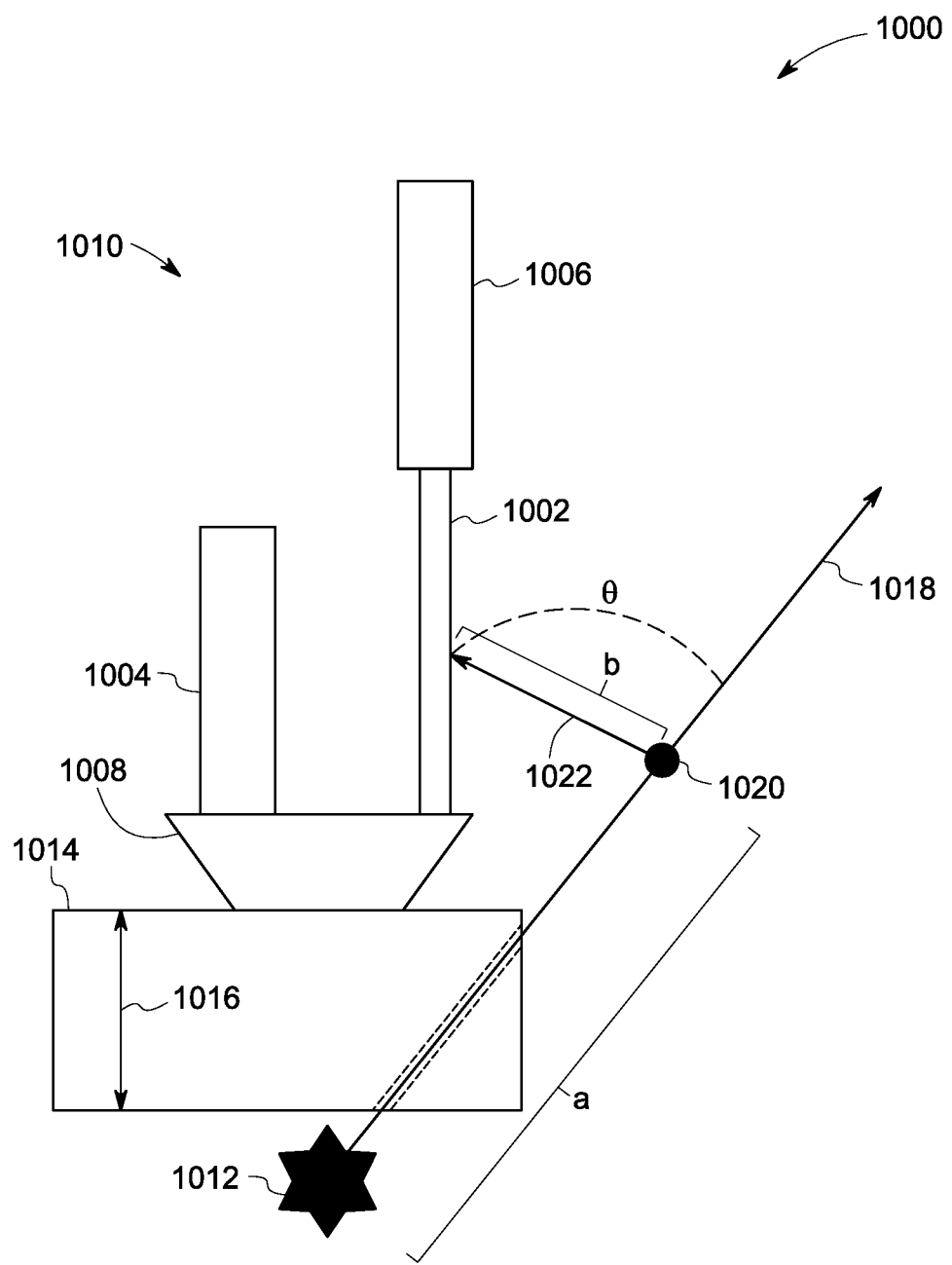
FIG. 10 is a diagrammatical representation of a portion of the inspection tool of FIG. 3 depicting a reduced/shorter travel path length between a radiation source, a scatter object, and a scintillator, in accordance with aspects of the present specification.

FIG. 10 depicts an example of shortening of a path length traversed between a radiation source, an inspection volume in an object, and a scintillator in a detector assembly. Reference numeral 1000 is generally representative of a portion of the inspection tool 300 of FIG. 3. Also, reference numerals 1002, 1004, 1006, 1008 are respectively representative of a scintillator, a first detector, a second detector, and a reflector. In the example of FIG. 10, the reflector 1008 is a right-angle prism reflector. The scintillator 1002, the first detector 1004, the second detector 1006, and the right-angle prism reflector 1008 may generally be referred to as a detector assembly 1010. As depicted in FIG. 10, a first end of the scintillator 1002 is disposed on a surface of the right-angle prism reflector 1008 and a second end of the scintillator 1002 is operatively coupled to the second detector 1004. Moreover, the first detector 1004 is disposed adjacent to the scintillator 1002 on the surface of the right-angle prism reflector 1008.

In addition, the inspection tool 1000 includes a radiation source 1012 and a radiation source shield 1014 disposed between the radiation source 1012 and the detector assembly 1010. Reference numeral 1016 is generally representative of a height of the radiation source shield 1014. The radiation source 1012 generates and directs a source beam 1018 towards an object of interest 1020. Once the source beam 1018 impinges on an inspection volume in the object 1020, a backscatter signal 1022 is generated. This backscatter signal 1022 impinges on the scintillator 1002.

The distance between the radiation source 1012 and the object 1020 is represented by "a" and the distance between the object 1020 and the scintillator 1002 is represented by "b." Also, "θ" is generally representative of a Compton backscatter angle. As previously noted, for efficient operation of the inspection tool, it is desirable to have a shorter path distance (a+b) between the source 1012 and the scintillator 1002 and/or detectors 1004, 1006. In the embodiment of FIG. 9, use of the right-angle prism reflector 1008 allows the first detector 1004 to be disposed adjacent to the scintillator 1002. This arrangement results in a reduction in the overall height of the detector assembly 1010, consequently facilitating proximate positioning of the scintillator 1002 to the radiation source 1012. This proximate positioning of the scintillator 1002 to the radiation source 1012 advantageously shortens the path length (a+b) traversed by the radiation signal 1018 from the radiation source 1012 to the scintillator 1002 via the object 1020. The shortened path length (a+b) in turn results in receipt of the backscatter signal having higher signal intensity by the scintillator 1002, thereby enabling efficient operation of the inspection tool. Accordingly, in the example of FIG. 10, while the thickness 1016 of the radiation source shield 1014 is maintained, the overall height of the detector assembly 1010 is reduced.

Figure 11:
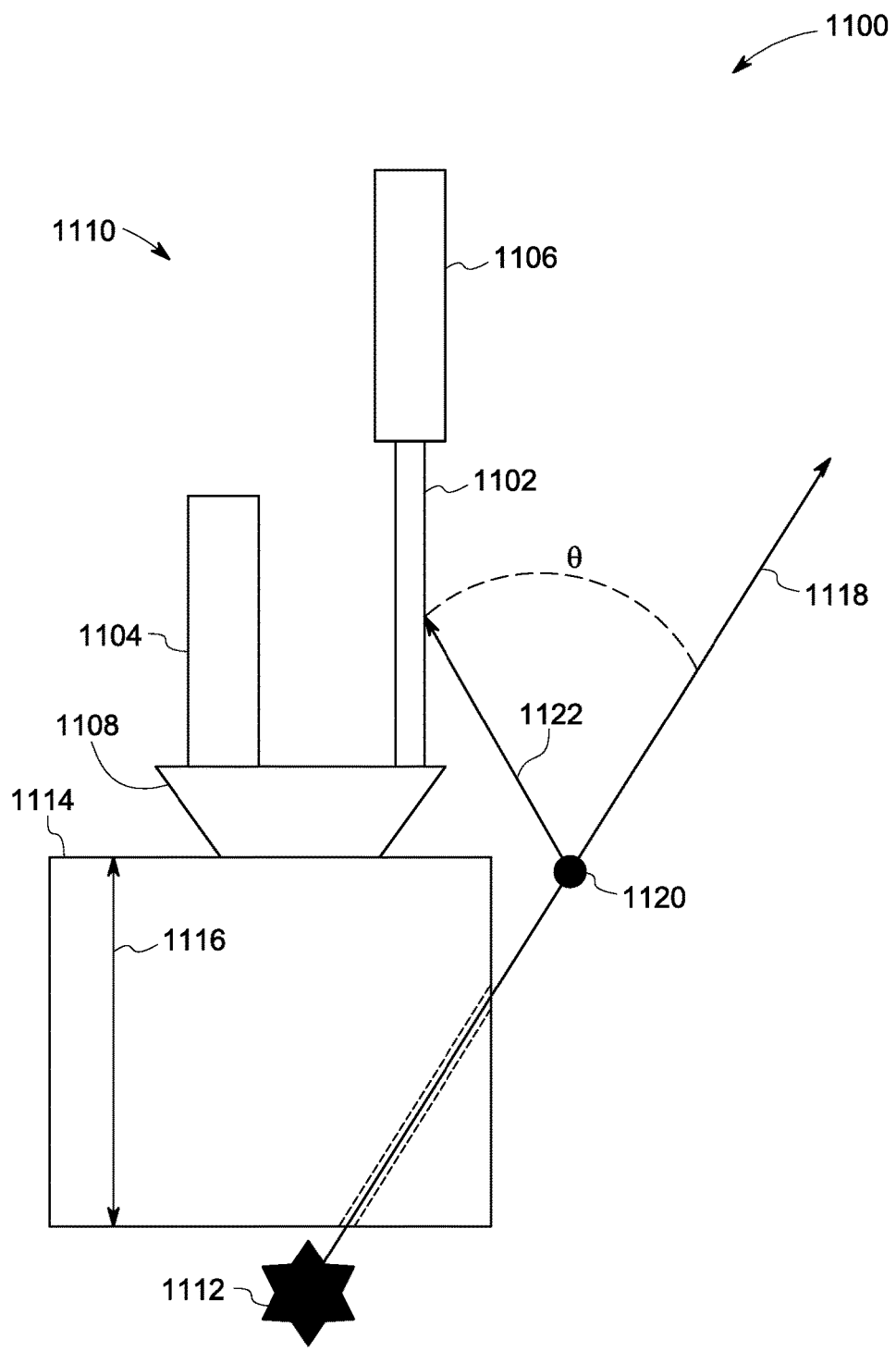
FIG. 11 is a diagrammatical representation of a portion of the inspection tool of FIG. 3 depicting use of a thicker radiation shield between a radiation source and a detector assembly, in accordance with aspects of the present specification.

Turning now to FIG. 11, an example of use of a thicker radiation source shield length between a radiation source and a scintillator in the inspection tool 300 of FIG. 3 is depicted. Reference numeral 1100 is generally representative of a portion of the inspection tool 300 of FIG. 3. In addition, reference numerals 1102, 1104, 1106, 1108 are respectively representative of a scintillator, a first detector, a second detector, and a reflector. The scintillator 1102, the first detector 1104, the second detector 1106, and the reflector 1108 may generally be referred to as a detector assembly 1110. In the configuration of FIG. 11, a first end of the scintillator 1102 is disposed on a surface of the reflector 1108 and a second end of the scintillator 1102 is operatively coupled to the second detector 1104. Moreover, the first detector 1104 is disposed adjacent to the scintillator 1102 on the surface of the reflector 1108.

In addition, the inspection tool 1100 includes a radiation source 1112 and a radiation source shield 1114 disposed between the radiation source 1112 and the scintillator 1102. Reference numeral 1116 is generally representative of a height of the radiation source shield 1114. The radiation source 1112 generates and directs a source beam 1118 towards an inspection volume in the object of interest 1120. Once the source beam 1118 impinges on the object 1120, a backscatter signal 1122 is generated. This backscatter signal 1122 impinges on the scintillator 1102.

As noted with reference to FIG. 10, the arrangement of the scintillator 1102, the first and second detectors 1104, 1106, and the right-angle prism reflector 1108 aids in reducing the height of the detector assembly 1110. This reduced height of the detector assembly 1110 allows use of a radiation shield 1114 of greater thickness 1116 without moving the scintillator 1102 away from the radiation source 1112, as depicted in the example of FIG. 11. Additionally, the use of the increased radiation shield thickness 1116 aids in reducing the bleed through from the radiation source 1112 and the reduced travel path length result in improved signal to noise ratio (SNR). Accordingly, in the example of FIG. 11, while the reduced overall height of the detector assembly 1110 is maintained, the thickness 1116 of the radiation source shield 1114 is increased and the bleed through that includes direct radiation from the radiation source 1112 impinging on the scintillator 1102 is reduced.

Figure 12:
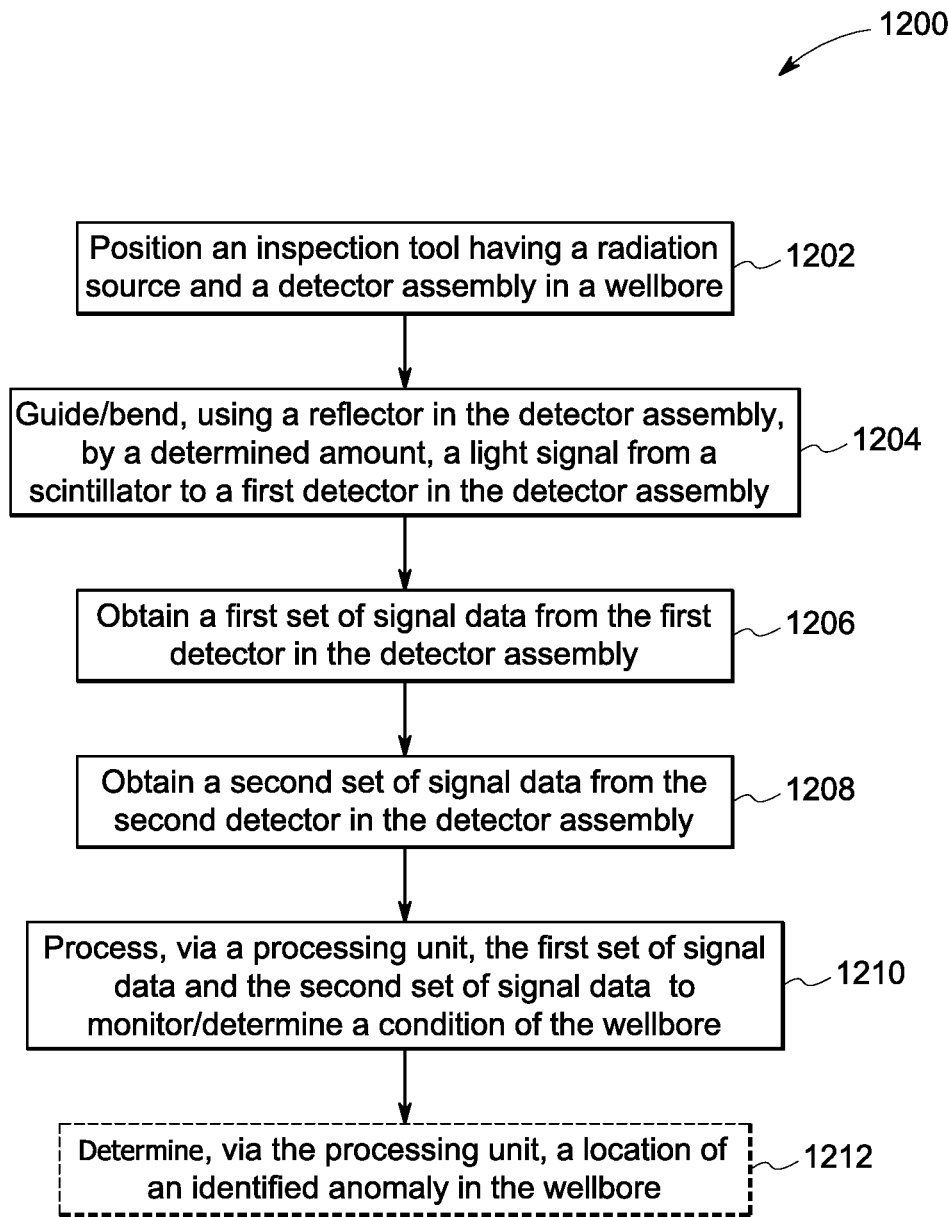
FIG. 12 is a flow chart illustrating an exemplary method for monitoring a wellbore using the inspection tool of FIG. 3, in accordance with aspects of the present specification.

Referring now to FIG. 12, a flowchart 1200 illustrating a method for inspecting a wellbore is presented. The method 1200 is described with reference to the components of FIGS. 1-11.

The method 1200 starts at step 1202 where the inspection tool 300 is disposed in a wellbore such as the wellbore 200. In one example, the inspection tool 300 may be disposed in the production tubing 202 of the wellbore 200. The radiation source 302 of the inspection tool 300 generates an X-ray source beam 304 that strikes the inspection volume 306 in the object of interest. In one example, the object of interest may be a wall of the production tubing 202 or a wellbore structure. Subsequently, the backscatter signal 322 is generated. The scintillator 310 generates a light signal in response to an impinging backscatter signal 322. A first portion of the light signal is directed towards the first detector 312 and a second portion of the light signal towards the second detector 314.

Accordingly, at step 1204, the first portion of the light signal is directed from the scintillator 310 towards the first detector 312 via use of the reflector 316, such as a right-angle prism reflector. More particularly, directing the first portion of the light signal entails redirecting/bending the first portion of the light signal by a determined amount via use of the right-angle prism reflector 316 and guiding the bent light signal to the first detector 312. As previously noted, in some embodiments, the determined amount may be in a range from about 150 degrees to about 210 degrees. Also, one non-limiting example of the determined amount is about 180 degrees. In this example, the first portion of the light signal may be redirected or bent by about 180 degrees prior to being conveyed from the scintillator 310 to the first detector 312.

As will be appreciated, the first and second detectors 312, 314 respectively generate sets of signal data such as electrical signals in response to the first and second portions of light received from the scintillator 310. A first set of signal data is acquired from the first detector 312, as indicated by step 1206. In a similar fashion, as indicated by step 1208, a second set of signal data is acquired from the second detector 314. In one embodiment, the processing subunit 112 may be configured to acquire the first and second sets of signal data from the first and second detectors 312, 314 in the detector assembly 308.

Furthermore, the processing subunit 112 may be configured to process/analyze the first and second sets of signal data to monitor a condition of the wellbore, as depicted by step 1210. In particular, the processing subunit 112 may be configured to analyze the first and second sets of signal data to identify presence of any discrepancy/variation in the first and second sets of signal data. By way of example, in one embodiment, the processing subunit 112 may be configured to determine an intensity of the first set of signal data, an intensity of the second set of signal data, or a combination thereof. Additionally, the processing subunit 112 may be configured to identify a presence of an anomaly in the wellbore 200 based on the intensity of the first set of signal data, the intensity of the second set of signal data, or a combination thereof. More particularly, presence of any discrepancies/variations in the first and second sets of signal data may be indicative of an anomaly/defect in the wall of the production tubing 202.

In accordance with further aspects of the present specification, if the presence of an anomaly is identified, the processing subunit 112 may also be configured to determine a location/position of the identified anomaly, as indicated by step 1212. By way of example, the processing subunit 112 is configured to identify a portion of the scintillator 310 that is activated by the backscatter signal 322 by computing a ratio of count rates of the first and second detectors 312, 314. Positional information corresponding to this count rate ratio may be obtained by the processing subunit 112. This information may be used to identify the depth location of the anomalies in the wellbore 200. Additionally, multiple dual ended detector assemblies may be arranged in a determined pattern such as a circular pattern to provide azimuthal defect resolution. In one example, the detector assemblies may be arranged in a circular pattern around a long axis of the inspection tool.

Use of the method 1200 aids in inspecting/monitoring the integrity of the wellbore without having to extract the production tubing out of the wellbore. This method of inspecting the integrity of the wellbore may be referred to as "through-tubing inspection." Moreover, in certain embodiments, one or more of information related to the condition of the wellbore, the first set of signal data, the second set of signal data, an identified anomaly/defect, or combinations thereof may be visualized on a display, such as the display unit 114.

Figure 13:
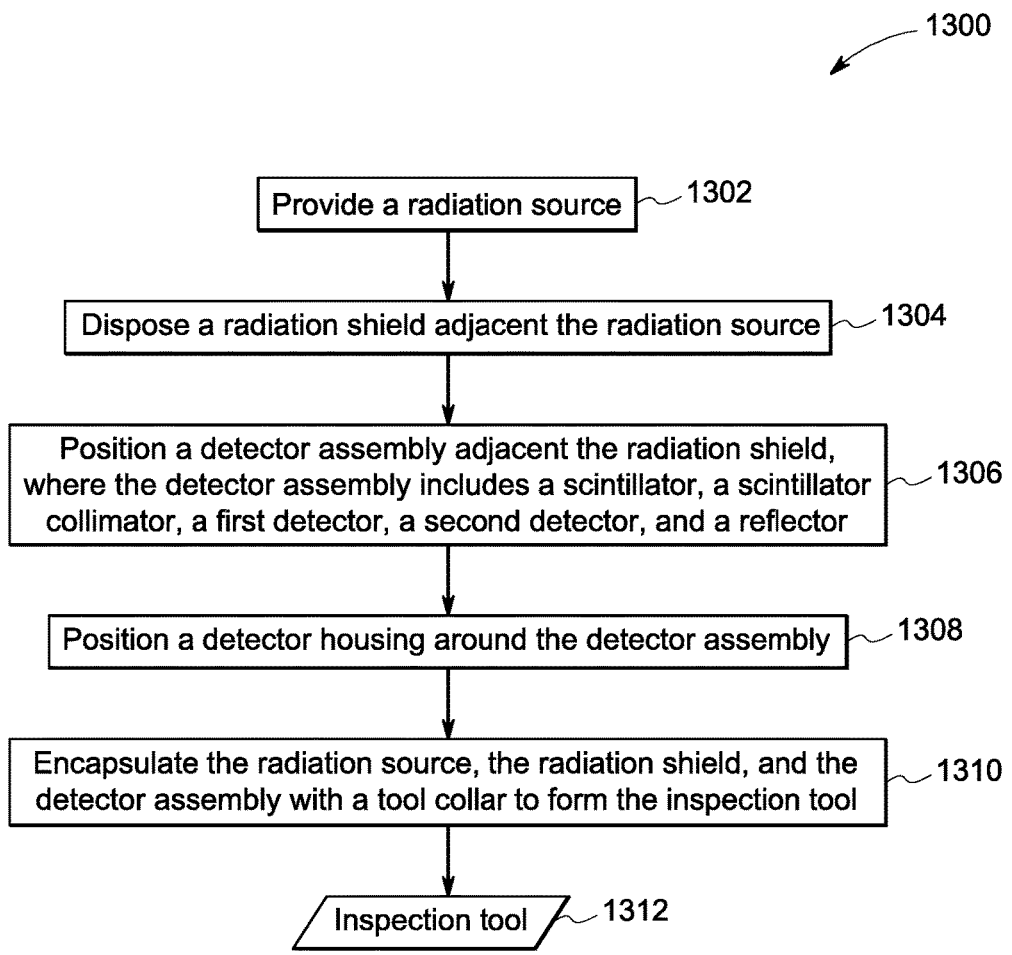
FIG. 13 is a flow chart depicting an exemplary method for forming the inspection tool of FIG. 3, in accordance with aspects of the present specification.

FIG. 13 is a flowchart 1300 depicting a method for forming an inspection tool such as the inspection tool 300 of FIG. 3. The method 1300 is described with respect to the components of FIGS. 1-11.

At step 1302, the radiation source 302 is provided. The radiation source 302 may be an X-ray source or a gamma ray source. Additionally, the radiation source shield 326 is disposed adjacent to the radiation source 302. As previously noted, the radiation source shield 326 is configured to protect other components of the inspection tool 300 from the radiation generated by the radiation source 302.

Subsequently, the detector assembly 308 is positioned adjacent the radiation source shield 326, as indicated by step 1306. It may be noted that step 1306 further includes forming the detector assembly 308. Forming the detector assembly 308 includes providing the scintillator 310, the first detector 312, and the second detector 314, and the reflector 316. In particular, a first end of the scintillator 310 is disposed on a surface of the reflector 316. The first detector 312 is disposed adjacent to the scintillator 310 on the surface of the reflector 316. More specifically, the first detector 312 is optically coupled to the scintillator 310 via the reflector 316. Also, a second end of the scintillator 310 is operatively coupled to the second detector 314. Furthermore, at step 1306, the scintillator collimator 318 is disposed around the scintillator 310, where the scintillator collimator 318 is configured to selectively receive the backscatter X-ray radiation signal 322.

Additionally, at step 1308, the detector housing 320 is positioned around the arrangement of the first and second detectors 312, 314, the scintillator 310, the reflector 316, and the scintillator collimator 318 to form the detector assembly 308. Moreover, at step 1310, the radiation source 302, the radiation source shield 326, and the detector assembly 308 are encapsulated with the tool collar 324 to form the inspection tool 1312.

Various embodiments of methods and systems for monitoring a wellbore are presented. In particular, the systems and methods presented hereinabove provide an inspection tool for monitoring the integrity of the wellbore. The inspection tool entails use of a reflector such as a right-angle prism reflector to bend/guide light from a scintillator into a detector in a detector assembly. This design shortens the height of the overall detector assembly that includes a first detector, a scintillator, a second detector, and the reflector. The shortened height of the detector assembly in turn enables the placement of a detector element or a scintillator in close proximity to a radiation source. In particular, the closer placement of the scintillator to the radiation source shortens the travel path distance of source and backscatter photons from the radiation source to the scintillator, thereby enhancing the efficiency of the inspection tool. Moreover, the shortened height of the detector assembly provides a compact design that is advantageous for functionality, packaging, and overall cost.

Additionally, by reducing the overall height of the detector assembly, the thickness of the radiation source shield may be increased without moving the scintillator further away from the radiation source. Moreover, the thicker radiation shield facilitates reduction in bleed through of radiation from the radiation source to impinging directly onto the scintillator, thereby reducing noise in the inspection tool. Use of the radiation source shield with increased thickness and/or the shortened travel path distance of the source and backscatter photons from the radiation source to the scintillator aid in improving the signal-to-noise ratio (SNR) of the inspection tool.

Furthermore, the inspection tool permits inspection of the casings and annuli of the wellbore without having to extract the production tubing out from its current location. In particular, use of the inspection tool with deep penetration depth facilitates through-tubing inspection, thereby eliminating the need to pull out the production tubing before wellbore integrity inspection.

Additionally, the compact design of the detector assembly allows for more design freedom. The backscatter angle (Compton angle) between the X-ray source beam and the backscatter X-ray radiation signal may be optimized with more design freedom to facilitate an enhanced SNR.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:
1. A detector assembly, comprising:
a scintillator configured to generate a light signal in response to an impinging radiation signal from an object, wherein the scintillator has a first end and a second end;
a first detector disposed adjacent the scintillator and configured to receive a first portion of the light signal from the scintillator;
a second detector operatively coupled to the second end of the scintillator and configured to receive a second portion of the light signal from the scintillator; and
a reflector operatively coupled to the scintillator and the first detector and configured to guide the light signal from the scintillator to the first detector, wherein the reflector is configured to redirect the first portion of the light signal by a determined amount to reduce a path length between a radiation source, the object, and the scintillator.

2. The detector assembly of claim 1, wherein the scintillator and the first detector are optically coupled to the reflector.

3. The detector assembly of claim 1, wherein the reflector comprises a first reflective surface and a second reflective surface.

4. The detector assembly of claim 1, wherein the reflector comprises a first prism having a first outer reflective surface and a second prism having a second outer reflective surface.

5. The detector assembly of claim 1, wherein the reflector comprises a first prism having a first inner reflective surface and a second prism having a second inner reflective surface.

6. The detector assembly of claim 1, wherein the reflector comprises a right-angled prism reflector.

7. The detector assembly of claim 1, wherein the reflector comprises a reflective coating disposed on at least a portion of an outer surface of the reflector.

8. The detector assembly of claim 7, wherein the reflective coating comprises aluminum, silver, gold, protected aluminum, a high-temperature reflective film, or combinations thereof.

9. The detector assembly of claim 1, wherein the impinging radiation signal comprises a backscatter signal received from the object.

10. The detector assembly of claim 1, further comprising a scintillator collimator disposed around the scintillator and configured to selectively receive the impinging radiation signal.

11. The detector assembly of claim 1, further comprising a detector housing configured to surround at least the scintillator, the first detector, the second detector, and the reflector, wherein the detector housing is configured to be selectively opaque to the impinging radiation signal.

12. The detector assembly of claim 1, wherein determined amount is in a range from about 150 degrees to about 210 degrees.

13. An inspection tool for monitoring a wellbore, comprising:
a radiation source;
a detector assembly disposed proximate the radiation source, wherein the detector assembly comprises:
a scintillator configured to generate a light signal in response to an impinging radiation signal from an object, wherein the scintillator has a first end and a second end;
a first detector disposed adjacent the scintillator and configured to receive a first portion of the light signal from the scintillator;
a second detector operatively coupled to the second end of the scintillator and configured to receive a second portion of the light signal from the scintillator; and
a reflector operatively coupled to the scintillator and the first detector and configured to guide the light signal from the scintillator to the first detector, wherein the reflector is configured to redirect the first portion of the light signal by a determined amount to reduce a path length between the radiation source, the object, and the scintillator.

14. The inspection tool of claim 13, further comprising a control unit operatively coupled to the detector assembly, wherein the control unit comprises at least a processor configured to process signal data from the first detector and the second detector to determine a condition of the wellbore.

15. The inspection tool of claim 14, wherein the control unit is further configured to generate positional information corresponding to the condition of the wellbore.

16. The inspection tool of claim 13, further comprising a radiation shield disposed between the radiation source and the detector assembly, wherein the radiation shield is configured to shield the detector assembly from radiation generated by the radiation source.

17. The inspection tool of claim 13, further comprising a tool collar configured to encapsulate the inspection tool.

18. The inspection tool of claim 13, wherein the inspection tool is configured to be positioned in the wellbore to determine the condition of the wellbore.

19. A method for inspecting a wellbore, the method comprising:
positioning an inspection tool in the wellbore, wherein the inspection tool comprises:
a radiation source;
a radiation shield disposed adjacent the radiation source;
a detector assembly disposed proximate the radiation source, wherein the detector assembly comprises:
a scintillator configured to generate a light signal in response to an impinging radiation signal from an object, wherein the scintillator has a first end and a second end;
a scintillator collimator disposed around the scintillator and configured to selectively receive the impinging radiation signal;
a first detector disposed adjacent the scintillator and configured to receive a first portion of the light signal from the scintillator;
a second detector operatively coupled to the second end of the scintillator and configured to receive a second portion of the light signal from the scintillator;
a reflector operatively coupled to the scintillator and the first detector and configured to guide the light signal from the scintillator to the first detector, wherein the reflector is configured to redirect the first portion of the light signal by a determined amount to reduce a path length between the radiation source, the object, and the scintillator;
directing the light signal, via the reflector, from the scintillator to the first detector to reduce a path length between the radiation source, the object, and the scintillator;
obtaining a first set of signal data from the first detector;
obtaining a second set of signal data from the second detector; and
processing, by a control unit, the first set of signal data and the second set of signal data to monitor a condition of the wellbore.

20. The method of claim 19, wherein processing, by the control unit, the first set of signal data and the second set of signal data comprises:
determining an intensity of the first set of signal data, an intensity of the second set of signal data, or a combination thereof; and
identifying a presence of an anomaly in the wellbore based on the intensity of the first set of signal data, the intensity of the second set of signal data, or a combination thereof.

21. The method of claim 20, further comprising generating positional information corresponding to the identified anomaly in the wellbore, wherein generating the positional information comprises:
determining a detector count corresponding to the first detector and a detector count corresponding to the second detector;

computing a count ratio based on the detector counts corresponding to the first detector and the second detector to identify a portion of the scintillator activated by the impinging radiation signal; and obtaining the positional information of the anomaly in the wellbore based on the activated portion of the scintillator to determine a depth location, an azimuthal location, or a combination thereof.

22. The method of claim 19, wherein directing the light signal comprises guiding the light signal by reflecting the light signal by a determined amount via the reflector.

23. The method of claim 19, further comprising forming the inspection tool, wherein forming the inspection tool comprises:

providing the radiation source;

disposing the radiation shield disposed adjacent the radiation source;

forming and positioning the detector assembly adjacent to the radiation shield, wherein forming the detector assembly comprises:

providing the reflector;

disposing the scintillator on a surface of the reflector such that a first end of the scintillator is optically coupled to the surface of the reflector;

positioning the first detector adjacent the scintillator on the surface of the reflector such that the scintillator is optically coupled to the first detector to reduce a travel path length between the radiation source, the object, and the scintillator;

operatively coupling the second detector adjacent to a second end of the scintillator, wherein the second end of the scintillator is opposite the first end of the scintillator;

disposing the scintillator collimator around the scintillator, wherein the scintillator collimator is configured to selectively receive the impinging radiation signal; and encapsulating the detector assembly within a housing to form the detector assembly.

* * * * *